United States Patent [19]

Freis et al.

[11] 3,960,781

[45] June 1, 1976

[54] ISOCYANATE-CAPPED SURFACE ACTIVE COMPOSITIONS AND METHODS OF USING THEM

[75] Inventors: Richard E. Freis, Minneapolis; Larry M. Rue, Inver Grove Heights, both of Minn.

[73] Assignee: Economic Laboratories, Inc., St. Paul, Minn.

[22] Filed: May 12, 1975

[21] Appl. No.: 576,348

Related U.S. Application Data

[62] Division of Ser. No. 350,004, April 11, 1973, Pat. No. 3,899,387.

[52] U.S. Cl. .............................. 252/541; 252/357; 252/548; 252/DIG. 1
[51] Int. Cl.² ..................... B01F 17/16; C11D 3/33; C11D 1/72
[58] Field of Search .... 252/541, 548, 357, DIG. 14, 252/DIG. 1, 301.2 W; 260/471 C, 615 B; 162/158

[56] References Cited
UNITED STATES PATENTS

| | | | |
|---|---|---|---|
| 2,948,691 | 8/1960 | Windemuth et al. | 260/471 C |
| 3,082,172 | 3/1963 | Temple et al. | 252/548 |
| 3,142,699 | 7/1964 | Wagner | 260/471 C |
| 3,180,786 | 4/1965 | Domba et al. | 162/158 |
| 3,334,147 | 8/1967 | Brunelle et al. | 260/615 B |
| 3,518,113 | 6/1970 | MacGuan | 162/164 X |
| 3,629,319 | 12/1971 | Jonaitis et al. | 260/471 C |

FOREIGN PATENTS OR APPLICATIONS 1,495,749   6/1969   Germany

OTHER PUBLICATIONS

J. P. Casey, "Pulp and Paper" vol. II, Sec. Ed. Interscience Publishers, N. Y., N. Y., pp. 1178–1179.
Schwartz et al., "Surface Active Agents and Detergents," vol. II, Interscience Publishers, Inc., N. Y., N. Y., 1958, p. 130.

*Primary Examiner*—Thomas J. Herbert, Jr.
*Attorney, Agent, or Firm*—Thomas M. Meshbesher

[57] ABSTRACT

Diaryl urethanes made by capping poly (oxyalkylene) diols with monoisocyanates are characterized by a desirable hydrophobe/hydrophile balance typically evidenced by low cloud points, the ability to form micelles in aqueous media, the ability to reduce stable foam, and the ability to be taken up and retained by paper fibers, the low foaming or de-foaming capability of these compounds is useful in machine dishwashing detergents and additives, which hydrophobe/hydrophile balance is typically obtained through a combination of oxyethylene and oxypropylene units or blocks in the oxyalkylene chain.

7 Claims, No Drawings

ISOCYANATE-CAPPED SURFACE ACTIVE COMPOSITIONS AND METHODS OF USING THEM

This is a division of our co-pending application, Ser. No. 350,004, filed Apr. 11, 1973 now U.S. Pat. No. 3,899,387.

FIELD OF THE INVENTION

This invention relates to polyoxyalkylene glycols capped with monoisocyanates, the resulting diurethane compound having a combination of properties including the ability to form micelles in aqueous media, the ability to reduce foam, and the ability to reduce paper re-wet times. Another aspect of this invention relates to anti-spotting compositions, de-foaming compositions, methods for promotion of proper and efficient use of wash water and rinse water for articles such as dishes in a cleaning apparatus such as an automatic or machine dishwasher, and methods for improving the re-wet time of cellulosic waterlaid sheets such as paper while simultaneously reducing foaming in the papermaking machine. Another aspect of this invention relates to paper re-wet treatments wherein a waterlaid sheet such as paper is made more water-sensitive by treatment with an aromatic monoisocyanate-capped polyoxyalkylene diol.

DESCRIPTION OF THE PRIOR ART

Low foaming or de-foaming non-ionic compounds and surfactants have a variety of uses, e.g. in automatic or machine dishwashing. Typically, these non-ionic compounds are derived from the condensation of an alcohol or the like with ethylene oxide, and at least some propylene oxide. Terminal hydroxyl groups remaining after the codensation reaction may be capped, i.e. converted from OH to an ether group, or the like. Non-ionic monohydroxy detergents are sometimes converted to mono-urethanes. Alternatively, hydroxyl-terminated oxyalkylene chains can be coupled together with linking groups such as urethane "bridges" derived from di-isocyanates. Generally speaking, some of the best paper re-wet agents and de-foamers are aryloxy- or benzyloxy-capped oxyalkylene glycols. Unfortunately, such compounds are more difficult to prepare than isocyanate-capped materials and can be contaminated with byproducts (such as NaCl) which are hard to remove.

It is a generally known technique in the art of polyurethane chemistry to adjust the NCO/OH ratio of the urethane-forming reactants with monoisocyanates. Thus, aromatic and aliphatic monoisocyanates are typically used in conjunction with polyols, particularly when a polyol mixture containing at least some triol or tetrol is among the polyurethane-forming reactants.

In the art of spray washing (e.g. machine dishwashing or other mechanical methods of cleaning articles involving a spray wash or rinse step), the formation of stable foam in wash water or rinse water can lead to serious difficulties. For example, foam formed from the action of water on proteinaceous matter can be "stable" in the sense that the foam height descends slowly, at best, over a period of seconds or even several minutes. Thus, interaction of the wash water with egg or milk food soils can produce an amount of stable foam sufficient to clog machinery or slow down the spray arm of the dishwashing machine. Several defoaming compounds have been developed to counteract this foaming effect. Stable foam can be reduced with these compounds, particularly when the wash water or rinse water is at a temperature in excess of 140°F. (60°C.). However, in the range of normal ambient temperatures up to 140°F. (60°C.), the effectiveness of the prior art de-foamers tends to decrease with decreasing temperature. That is, the amount of stable foam tends to increase with decreasing temperature. For reasons of safety, particularly in home machine dishwashers, rinse or wash water temperatures in excess of 140°F. (60°C.) are not preferred. Furthermore, with long water lines and excessive demands upon the hot water heater, the wash and rinse water can drop to a temperature of 100°F. or less. Foaming problems at these lower temperatures are particularly acute with front-loading washing machines and high pressure dishwashing equipment.

The formation of stable foam can also be undesirable in the art of papermaking. Oftentimes, de-foamers or de-foaming surfactants are added to one or more stages of the wash (e.g. the third stage or stuff box, just before the head box), or, in some cases, to the head box itself. One reason for adding a de-foaming agent is to counter the foaming caused by additives such as re-wet agents. In fact, a typical commercial practice is to sell a re-wet agent and a de-foaming agent as a paper additive combination. ("Re-wet" agents are an art-recognized class of chemical compositions or compounds characterized in physico-chemical terms by the ability to remain entrapped in the fibers of a sheet of paper or the like and increase its hydrophilic character.) A single surfactant or micelle-forming compound with both paper re-wet and de-foaming properties would be considered desirable in the paper industry, particularly in the art of making wet strength paper. Wet strength agents generally decrease the hydrophilic properties of the paper, thus increasing the need for a re-wet treatment.

The demarcation of the class of compounds or compositions known as paper "re-wet" agents is strictly or largely according to performance tests, cloud point data, and the like, rather than according to chemical composition or structure, since effective "re-wet" agents may differ significantly in chemical structure. It is known that re-wet agents should be hydrophilic enough to improve the ability of the paper to take up water. It is also known that re-wet agents should be hydrophobic enough to be rapidly taken up by raw or treated pulp slurries and stay on the surfaces of the paper fibers; an excessively hydrophilic agent could be taken up too slowly or even washed off of the paper fibers during processing on a Fourdrinier machine, a rotary paper former, or any other machine which makes paper from a rather dilute aqueous slurry of fibers. The ideal hydrophobe/hydrophile balance for a re-wet agent is oftentimes an empirical determination which varies with the nature of the hydrophobic and hydrophilic molecules or substituents which provide this balance and the nature of the source of paper fiber (softwood pulp, hardwood pulp, etc., which can be subjected to various chemical pre-treatments). The characterization of defoaming agents is based upon somewhat similar principles, but the ideal hydrophobe/hydrophile balance for defoaming can be different from that of a good paper re-wet agent—hence the commercial practice of combining the use of a re-wet agent with a defoamer.

The hydrophobe/hydrophile balance and other properties of a paper re-wet agent are preferably adjusted so as not to interfere with the wet strength of the paper, the color of the paper, the hydrolytic stability of the re-wet agent, etc.

SUMMARY OF THE INVENTION

It has now been discovered that the reaction product of (1) a polyoxyalkylene diol containing at least some oxyethylene units and (2) an aromatic mono-isocyanate, at an NCO:OH ratio of substantially 1:1 (preferably in the presence of a suitable catalyst) produces a diaryl polyether urethane with a useful combination of de-foaming and/or paper re-wet properties. A desirable aspect of the defoaming properties (i.e. the property of resisting or reducing the formation of stable foam) is that this property appears to be substantially independent of the water temperature (e.g. the temperature of the wash water or rinse water or the paper making slurry), even throughout a substantial portion of the temperature range below about 140°F. (60°C.). Improvements in low temperature de-foaming properties are generally observed when comparing the diaryl urethane with the corresponding uncapped diol, the dibenzyl ether analog of the diol, or even a monourethane analog. Differences are particularly evident in the range of about 20°–40°C., especially near the lower end of this range. Preferred compounds of this invention can have a hydrophobe/hydrophile balance which is well suited to both the "re-wetting" of paper and the reduction of stable foam formed during the manipulation of a papermaking slurry. Typically, this balance is obtained by capping a diol which is a block copolymer having at least one polyoxyethylene block and at least one polyoxypropylene block and/or a diol which is a random oxyethylene/oxypropylene copolymer.

In the art of spray washing (e.g. machine dishwashing), the diaryl urethane low temperature de-foaming agents of this invention can be included in a conventional dishwashing detergent composition or in a rinse additive composition. Typically, a rinse additive is provided by suspending a wax matrix containing the additive in the dishwashing tank or by adding a liquid rinse additive to an automatic dispenser built into the dishwashing machine.

In processes for re-wetting paper or other waterlaid sheets (e.g. facial tissue or the like), a small amount of a compound having carefully balanced hydrophilic properties is added during a "wash" stage, e.g. the third wash stage, which is generally just prior to the head box. The de-foaming property of the diaryl urethane complements the re-wetting property and reduces the need for an extraneous de-foaming additive. The compounds of this invention can, if desired, be blended with other paper rewet agents (e.g. the benzyl ether-capped analog, ethoxylated vegetable oils, or the like) for various re-wetting effects.

DETAILED DESCRIPTION OF THE INVENTION

The diaryl urethanes of this invention can be characterized by the following structural formula:

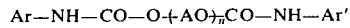

wherein
Ar and Ar' are monovalent aryl groups free of —NCO radicals,
A is an alkylene group containing 2–4 carbon atoms, at least some of the alkylene groups being $C_2$ alkylene, and $n$ is a number greater than 3 selected such that the divalent radical $+AO)_{\overline{n}}$ has a molecular weight of less than 12,000, preferably 500–6,000, e.g. 2,000–5,000. Various effects can be obtained throughout the ranges. For example, de-foamers typically have oxyalkylene chains with a molecular weight above 3,000. Good paper re-wet properties can be more easily obtained with oxyalkylene chains having a molecular weight above 900.

Preferably the divalent radical $+AO)_{\overline{n}}$ is an oxyethylene/oxypropylene block or random copolymer, e.g. a copolymer containing at least one oxyethylene block having at least 3 units and at least one relatively larger oxypropylene block or oxyethylene/oxypropylene block.

The starting materials and reaction conditions for producing the diaryl urethanes of this invention will now be described in detail.

DIOLS

As is well known in the art, polyether polyols can be made by condensing ethylene oxide, propylene oxide, butylene oxide, tetrahydrofuran, and the like with a mono- or polyhydroxy compound, e.g. ethylene glycol, glycerin, trimethylolpropane, pentaerithritol, ethanol-substituted amines, etc. Micelle-forming and/or water soluble polymeric diols with various desired surface active properties are typically made by condensing at least some ethylene oxide with ethylene or propylene glycol. To obtain a particular hydrophobe/hydrophile balance, 1,2-propylene oxide (or some other compound capable of forming a relatively hydrophobic repeating unit) is used with ethylene oxide as a co-monomer. (Another technique for obtaining a desired hydrophobe/hydrophile balance is to cap a very short poly(oxyethylene) chain with a rather high molecular weight, hydrophobic capping group.) A wide variety of polyoxyalkylene glycols are commercially available throughout a broad molecular weight range up to about 12,000 or more, the ranges most suitable for micelle-forming compounds of this invention having been described previously in defining $+AO)_{\overline{n}}$ of the above structural formula. Dimers, trimers, etc. of ethylene glycol are commercially available, and some known paper re-wet agents have as few as 3 oxyethylene units.

An extensive description of suitable polyoxyalkylene diols is contained in the following patents:

U.S. Pat. No. 3,048,548 (Martin et al.) issued Aug. 7, 1962
U.S. Pat. No. 3,036,130 (Jackson et al.) issued May 22, 1962
U.S. Pat. No. 3,082,172 (Temple et al.) issued Mar. 19, 1963
U.S. Pat. No. 3,334,147 (Brunelle et al.) issued Aug. 1, 1967
U.S. Pat. No. 3,549,543 (Kirstahler et al.) issued Dec. 22, 1970

Homopolymers of ethylene oxide are useful in this invention if the oxyethylene chain is relatively short, e.g. less than 25 units.

As can be seen from, for example, the Martin et al. Pat. (U.S. Pat. No. 3,048,548), one preferred method for obtaining a good ethylene oxy/propyleneoxy balance for de-foaming is to use alternating blocks of oxyethylene and oxypropylene units, although blocks of randomly co-polymerized alkylene oxides can also be used. Thus, if E is used to represent the oxyethylene block and P is used to represent the oxypropylene block, typical diols used in this invention are hydroxy-terminated E-P-E or P-E-P-E-P block copolymers. A typical method of preparation of the diol is described in column 4, lines 15–33 of the aforementioned U.S. Pat. No. 3,048,548.

An example of such a block copolymer is:

wherein PO is a 1,2-propyleneoxy group (as in U.S. Pat. No. 3,334,147, column 2, lines 12–20) and EO is an ethyleneoxy group. The numbers $a$, $b$, $c$, $d$, and $e$ can be the same or different, but it is preferred that $a$ and $e$ be the same and that $b$ and $d$ be the same. The ratio of $a+e$ or $b+d$ or $c$ to the sum of $a$ through $e$ is preferably in the range of 0.3 to 0.4 As in the Brunelle et al. patent, the total weight of the two terminal propyleneoxy blocks can amount to 34 to 35 percent (e.g. 34.4–34.75%) by weight of the total molecular weight; the total of the two intermediate ethyleneoxy blocks can amount to 32 to 33 percent (e.g. 32.2–32.6%) by weight of the total molecular weight; and the central propyleneoxy block can be 32.7–32.8 percent by weight of the total molecular weight. A preferred modification of this block copolymer diol is to form the center polymer block from propylene glycol and a mixture of EO and PO units so that 5–7% of the weight of this center block is EO units.

Another suitable type of diol is made from a 30–50 mole random ethyleneoxy/propyleneoxy copolymer or propyleneoxy homopolymer as the central block, with smaller ethyleneoxy blocks (e.g. 5–25 moles each) on either side of the central block. Terminal blocks of 1–5 moles each of oxypropylene are preferably included in the structure.

The hydrophobe/hydrophile balance provided by the propyleneoxy/ethyleneoxy content of, for example, the diols used in the de-foaming surfactants of U.S Pat. Nos. 3,334,147 or 3,048,548 is altered somewhat by the two aryl urethane capping groups. However, from the standpoint of low temperature de-foaming and paper re-wetting properties, the alterations appear to be generally desirable.

AROMATIC MONO-ISOCYANATES

Aromatic mono-isocyanates generally can be used to make the diaryl-urethanes of this invention from one or more of the aforementioned diols. However, all aromatic isocyanates do not work with equal effectiveness, and the monocyclic aromatic monoisocyanates (e.g. phenyl isocyanate) are particularly preferred for their ready availability. Polycyclic aromatic monoisocyanates, with their additional aromatic ring or rings, can affect the hydrophobe/hydrophile balance of the diurethane more than, for example, phenyl isocyanate. However, the hydrophobe/hydrophile balance can be readjusted by using a more hydrophilic diol, e.g. one containing a higher proportion of oxyethylene units.

Similarly, highly hydrophobic substituents on the aromatic ring on the mono-isocyanate can also be compensated for. Such adjustments in the hydrophobe/hydrophile balance can be avoided, however, if the substituents on the aromatic ring do not radically alter the properties of the aryl urethane capping group. For example, lower alkyl groups, lower alkoxy groups, halogens, and the like have been substituted on aromatic rings by techniques known in the art. Higher alkyl groups (e.g. up to $C_{18}$) have also been substituted on aromatic rings. As is known in isocyanate chemistry, aromatic compounds which can be converted to an aromatic amine and then phosgenated can be used to make aromatic isocyanates.

Generally speaking, by "aromatic mono-isocyanate" is meant a compound wherein the isocyanate radical is substituted directly on a position of the aromatic ring.

CATALYSTS AND REACTION CONDITIONS

A polyoxyalkylene diol can be "capped" with an aromatic mono-isocyanate in the manner generally known in the prior art for making urethanes from alcohols and isocyanates. Solid starting materials (e.g. high molecular weight polyols) can be melted at temperatures below 150°C. and the reaction can be carried out in the melt. If desired, solvents such as toluene, xylene, and other organic liquids free of active hydrogen can be used to dissolve the reactants or reduce the viscosity of the melt. Liquid isocyanates, diols, and catalysts (e.g. tertiary amines) can be selected for sufficient mutual compatibility to avoid or reduce the need for solvents. The stoichiometry of the reaction mixture should be selected so as to provide substantially complete capping of all free hydroxyl groups without using a large excess of isocyanate. (Excess isocyanate can be difficult to remove from the fully reacted reaction mixture and can be an undesirable contaminant.) Typically, about two moles of mono-isocyanate per mole of diol are used, thus providing an equivalent weight ratio or NCO:OH ratio of substantially 1:1. Deviations of about one or two tenths of an equivalent from the theoretical 1:1 ratio are generally permissible. The diarylurethane product can be sufficiently fully reacted to have a hydroxyl number less than about 10.

The NCO/OH reaction can be spontaneous, is often exothermic and is generally favored, both at mildly elevated temperatures (e.g. 30°–150°C.) and at normal ambient temperatures less than 30°C. (e.g. 20°–25°C.). The reaction time can be reduced with suitable conventional catalysts for the urethane-forming reaction. Among the conventional catalysts are the tertiary amines and various organo-metallic compounds and carboxylic acid salts of metals such as tin, lead, and mercury. The liquid tertiary amines (e.g. the $C_1$–$C_6$ trialkyl amines such as triethyl or tributyl amine) are preferred for ease of mixing with the reactants. Typically, reaction times of 0.5–5 hours are suitable, and reaction times less than 4 hours are entirely satisfactory in most cases. The presence and/or conversion of OH in the reaction mixture can be conveniently monitored by infra-red spectroscopy. The relative ease of forming the aryl urethane group as compared to the etherification of a hydroxyl group with, for example, a benzyl group is one of the advantageous features of the present invention. The benzyl ether capping reaction typically involves the use of metallic sodium, which can be hazardous, particularly with respect to the gaseous hydrogen by product. The sodium alcoholate/benzyl chloride reaction produces sodium chloride, which is also an undesired byproduct.

PROPERTIES OF THE DIARYL URETHANES

The diaryl urethanes of this invention, wherein at least a portion of the oxyalkylene chain comprises oxyethylene units, have surface active properties, e.g. as evidenced by their ability to form micelles in aqueous media. At low concentrations (e.g. 1 wt. %) and at temperatures below the cloud point of these diurethanes, they appear to form clear solutions in water. De-foaming capabilities tend to be insufficient when the cloud point is above 45°C. A typical cloud point for a diaryl urethane of this invention at 1 wt. % concentration in water is 100°F. (38°C.), preferably less than 50°F. (10°C.). The diaryl urethanes with low cloud points (e.g. less than 50°F.) generally have both paper re-wet and de-foaming properties. The molecular weight range of the diurethanes is, of course, higher than that of the parent diols, e.g. about 700–6,500.

The significance of the paper re-wet property is that the moisture-sensitivity of paper or other waterlaid sheets made from cellulosic fiber or the like can be increased. One important use of this property is in improving the water-sensitivity or wettability of tissues, paper towels, and the like, including those paper products which have been treated with a wet strength resin. Oftentimes conventional wet strength resins (e.g. those of the phenol-aldehyde type) make the paper product excessively hydrophobic. A re-wet treatment is one method for arriving at a proper balance of hydrophilic properties in the paper without unduly sacrificing wet strength or other desired properties. The effectiveness of a paper re-wet agent can be measured by placing a drop of water on a given type of paper. If the paper was formed without a re-wet agent, it will take a long time (e.g. 200–600 seconds) for the water to be absorbed. Paper formed with a re-wet agent will typically need less than a tenth of that time (e.g. 3–15 seconds) to absorb about the same amount of water.

In a preferred paper re-wet process of this invention, a re-wet composition or agent consisting of or containing a diurethane of this invention is added to the third stage wash or stuff box of the papermaking machine (Fourdrinier, rotary-former, or the like) just before the head box at the rate of about 5 to about 120 pounds of undiluted re-wet composition or agent per ton of finished paper. The amount of re-wet material added depends upon the character of the fiber in the papermaking slurry, e.g. upon the age, pitch content, etc. of the wood used to make the wood pulp. The wet strength additive is typically added just before or at about the same time as the re-wet additive, e.g. at the second stage.

As is well known in the art, a suitable pulp or the like is made into paper by beating it up in a large volume of water, generally about 90–99.5 parts by weight of water to 0.5–10 parts pulp (on a solid basis)— in fact, the papermaking slurry, at some stage, may contain only one-fourth percent (or less) by weight of solids. The slurry goes through the aforementioned "wash" stages, and is eventually picked up or deposited on a foraminous surface which permits the water to drain off, leaving a sheet-like mass of entangled fibers which becomes ordinary paper, facial tissue, paper towel stock, or some other type of waterlaid sheet.

A particularly important property, both in paper re-wet treatment and in mechanical dishwashing processes is the low foaming or de-foaming action of the diaryl urethanes of this invention. It is known that surface active agents with a cloud point less than 45°C. do not produce excessive foam in water solutions and can have the property of reducing stable foam generated by the action of hot wash water on proteinaceous food soils. In mechanical dishwashing, wherein the water can come in contact with milk residue, egg residue, and other foam-producing soils, it is preferred to provide a dishwashing composition with at least one agent capable of de-foaming action. Compounds of the present invention are effective de-foaming agents, both at elevated temperatures, e.g. 40°–70°C., and at normal ambient temperatures, e.g. 20°–25°C. Various standardized tests have been worked out to measure de-foaming action. A particularly realistic test is similar in concept to the test described in column 6 of the aforementioned U.S. Pat. No. 3,334,147. Instead of measuring the water pressure, however, the water pressure can also be kept substantially constant. In this case the height of the stable foam produced by egg soil or the like can be a measure of the performance of the de-foaming agent.

As is known in the art, the urethane linkage can be hydrolyzed under strongly acid or strongly basic conditions. Detergent, de-foaming, rinse additive, and paper re-wet compositions of this invention are nevertheless reasonably storage stable when properly formulated and have been generally found to be sufficiently stable under conditions of use, e.g. at normal ambient and mildly elevated temperatures, in mildy acidic or basic papermaking slurries, and in basic wash water having a pH in the range of, for example, 10.0 to 11.5 or 12.0. Typical acidic fibrous slurries (pH< 7) have a pH above 5.0.

The significance of the various surface active properties of compounds of this invention will be readily appreciated by those skilled in the art of formulating detergent compositions and rinse additives for mechanical or automatic dishwashing (as opposed to hand dishwashing). The water draining from glasses, dishes, flatware, and other utensils in the dishwasher tank is normally treated with a rinse additive composition, which can contain a nonionic surfactant of the defoaming type. In institutional mechanical dishwashers and some home dishwashers, the rinse additive composition can be introduced or metered into the wash tank in liquid form by a suitable automatic dispensing or metering device. In home dishwashing machines, the rinse additives can also be contained within a solid wax matrix which is suspended in a suitable location in the wash tank. Sprays of rinse water washing over the wax matrix take up small amounts of the rinse additive composition, including the defoamer-type compound.

FORMULATIONS CONTAINING DIARYL URETHANES

Diaryl urethanes of this invention with a suitably low cloud point (e.g. below 40° or 45°C. and preferably below 10°C.) can be used per se as re-wet agents. All aryl isocyanate-capped polyoxyalkylene diols do not work with equal effectiveness, however, and the poly-(oxyethylene/oxypropylene) diols of 500–6,000 (e.g. 3,000–4,000) molecular weight capped with phenyl isocyanate appear to be particularly preferred for their overall combination of properties, including the ability to reduce stable foam at normal ambient temperatures and the ability to be taken up and retained by the paper fibers with a consequent increase in the hydrophilic character of the paper product. The diaryl urethanes in the preferred molecular weight range* tend to be somewhat viscous, and various viscosity-lowering additives are preferably used in combination with these viscous re-wet agents. Viscosity control is desirable in view of the typical methods used in the paper industry to add the re-wet agent. For example, liquid re-wet agents packaged in drums or other shipping or storing containers can be provided with a pump and a small conduit or tube leading to the stuff box, any other suitable post-beater or wash stage, or even the head box — in short, a stage prior to the deposition of the papermaking slurry on a foraminous surface such as a screen or "wire". The flow rate of re-wet agent can be adjusted empirically by occasionally sampling the paper product and testing its re-wet time. Low viscosity re-wet compositions tend to flow somewhat more easily from the drum to the papermaking machine.

* which is ordinarily at least about 220 higher than the diol MW.

Solvents or diluents can be used to lower the viscosity of the re-wet composition, and among the more common diluents is water. In the event that the re-wet composition is less compatible with water than might be desired, various coupling solvents and coupling agents can be added to the water. (By "coupling" solvents or agents is meant a material which improves the homogeneity of the composition.) Among the commonly used coupling agents are the anionic surfactants, e.g. alkali metal sulfonates such as sodium xylene sulfonate. In a properly stabilized, homogeneous re-wet composition, virtually any amount of water can be used, but extremely large amounts of water will, of course, greatly increase the flow rate requirements. Organic solvents or diluents can be used in lieu of or in addition to the water or water/coupling agent combination. To further stabilize the re-wet composition for shipping and storage, freeze-thaw stabilizers can also be added. Other additives will occur to those skilled in the art.

One particularly convenient means for adjusting the viscosity of the re-wet formulation is the combination of other, less viscous re-wet agents with the diaryl urethanes of this invention. Available re-wet agents with a good hydrophobe/hydrophile balance and a relatively low molecular weight (e.g. 350–800) serve as diluents for the diaryl urethane and also make a contribution to the re-wetting action of the composition. Tall oil fatty acid ethoxylates containing 2–10 (e.g. 3) oxyethylene units have been found to be effective in thinning the diaryl urethane re-wet compositions without interfering with the desired hydrophobe/hydrophile balance. Other saturated or unsaturated $C_{12}$ to $C_{20}$ fatty acid esters of short-chain oxyethylene glycols will occur to those skilled in the art. Typically, about 1 to about 70% by weight of the re-wet composition can comprise a tall oil fatty acid ethoxylate, and a 40/60–60/40 (by weight) diaryl urethane/tall oil ethoxylate combination provides particularly good results. In any of these contemplated re-wet compositions, the active portion (i.e. the portion exclusive of organic solvents, water, and anionic coupling agents or the like) should comprise at least about 25% by weight of the diaryl urethane re-wet component.

Other conventional re-wet agents can also be included in the active portion of the composition in an amount ranging from 0% up to about 70% by weight. For example, the benzyl ether-capped oxyalkylene polymers of the type described previously can be used; see the aforementioned Brunelle et al. U.S. Pat. No. 3,334,147. Another type of re-wet agent suitable for combination with re-wet compositions of this invention is the alkyl-aryloxy-capped poly(oxyethylene) glycol type. This type of re-wet agent typically has the following structural formula:

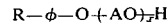

wherein

R is a saturated aliphatic chain containing 10–24 (preferably 12–18) carbon atoms, φ represents a divalent aromatic group such as phenylene, A is an alkylene group, preferably ethylene, and x is a small number, typically less than 10 and greater than 3, e.g. 6–7 (a fractional number of moles of ethylene oxide can be used in such compounds).

In terms of re-wet properties alone (i.e. without regard to de-foaming capability), the alkyl-phenoxy-poly(ethyleneoxy) ethanols of this type provide a good standard for comparison in testing re-wet compositions of this invention. Another good standard for comparison is a combination of a benzyl ether-capped oxyethylene/oxypropylene glycol and a tall oil fatty acid ethoxylate.

As pointed out previously, the diaryl urethanes of this invention can be used as low temperature de-foaming agents in rinse additives and in mechanical dishwashing detergent compositions. Rinse additives can be either solid or liquid. A typical type of liquid rinse additive comprising water, a wetting agent, and a de-foaming agent is disclosed in U.S. Pat. No. 3,082,172. Liquid rinse additive compositions of this type contain at least one poly(oxypropylene/oxyethylene) diol wetting agent, preferably similar or identical to the diols used as raw materials for making diaryl urethanes of this invention. The wetting agent helps the wash water to drain from the utensils being washed in smooth sheets or thin films, thereby preventing the formation of hanging drops which form spots. The preferred diaryl urethane de-foaming agents of this invention assist in maximizing the water pressure during the rinse cycle and do not detract from the anti-spotting effects of the wetting agent. However, the diaryl urethane de-foaming agent can lower the cloud point of the liquid rinse additive composition, and, desirably, coupling agents or solvents are added to the composition to improve its homogeneity and/or storage stability.

In the solid rinse additive compositions, such coupling agents are not necessary. Typically, these solid compositions comprise a combination of wetting agent and de-foaming agent (once again, the diaryl urethane serves as the de-foaming agent), suitable inorganic or organic fillers, and a suitable wax matrix. All waxes do not work with equal effectiveness, and the alkanolamide waxes are preferred. The wetting agent/de-foaming agent combination is ordinarily blended with a roughly equal amount of wax. The amount of inorganic or organic filler can be slightly larger than either the amount of de-foamer and wetting agents or wax, but is typically less than half of the total composition. A typical formula for a solid rinse additive is:

30 weight % de-foamer and wetting agent
30 weight % alkanol-amide wax
40 weight % inorganic or organic fillers The low temperature de-foaming action of the diaryl urethanes of this invention is useful in various types of mechanical dishwashing detergent formulations including the phosphate-containing type (see, for example, Martin et al, U.S. Pat. No. 3,048,548, and Oberle, U.S. Pat. No. 3,306,858) and the low-phoshate or phosphate-free detergents such as the detergent described in U.S. Pat. No. 3,700,599 (Mizuno et al.), issued Oct. 26, 1972. The diaryl urethane can be added to either dry or liquid detergent compositions; however, greater stability for the diaryl urethane is observed with dry (powdered) compositions, even when the powdered detergent is stored or aged at moderately high ambient temperatures such as 120°F. The preferred types of mechanical dishwashing compositions generally comprise water-conditioning or softening agents, including sequestering agents such as the alkali metal condensed polyphosphates; pH-adjusting or buffering agents or "builders", e.g. alkali metal carbonates, hydroxides, borates, orthophosphates, etc.; corrosion inhibiting agents, e.g. the metasilicates (which also function as "builders"); chlorine-releasing agents such as the hypochlorites (in liquid detergents) or the chlorinated isocyanurates or isocyanuric acid-type compounds (particularly in solid detergents); and other ingredients such as de-flocculating agents, coloring agents, fillers, etc. The water-conditioning agent normally comprises 2–70 weight percent of the composition, the pH-adjusting or buffering agent 1–70 weight percent, and an alkali metal metasilicate 0–70 weight percent. De-foaming agents are typically included in these compositions to the extent of 0.1–5 weight percent, though greater percentages are permissible. The amount of chlorine-releasing agent is also typically in this 0.1–5 weight percent range. The preferred alkali metals are sodium and potassium, and the preferred polyphosphates contain 2–10 (e.g. 3) phosphate units.

A typical dry powdered machine dishwashing detergent composition of this invention is as follows:

| Parts By Weight | Ingredients |
| --- | --- |
| 40–60 | alkali metal metasilicates (e.g. sodium metasilicate) |
| 30–50 | alkali metal condensed polyphosphates (e.g. sodium tripolyphosphate) |
| 0–60 | sodium or potassium carbonate |
| 0.5–3 | an alkali metal salt of a chlorinated isocyanurate (e.g. sodium or potassium dichloroisocyanurate) |
| 0.5–3 | diaryl urethane of oxyethylene/oxypropylene copolymer of 3,000–4,000 molecular weight |

Detergent formulations of this general type are alkaline when dissolved in water. For example, at 0.1–1% by weight of detergent solids in water, the pH of the resulting solution can vary from about 10 to about 11 for home dishwashing use, and about 11 to about 12.5 for institutional dishwashing use. The lower end of the pH range (below 12.0 and preferably below 11.0) is preferred in this invention.

The invention is illustrated in the following nonlimiting Examples.

EXAMPLE 1

Part A: Preparation of Diaryl Urethane

A liquid poly(oxyethylene/oxypropylene) diol was prepared generally in accordance with the teachings of U.S. Pat. No. 3,048,548 (Martin et al.), at column 4, lines 15–33, except that the center block of the polymer was prepared from propylene glycol and a mixture of propylene oxide and ethylene oxide, thereby obtaining a random copolymer center block. Of the reactants used to make this center block, 6.7% by weight was ethylene oxide. Each homopolymeric oxyethylene block on either side of the center block made up 16.11% by weight of the total polymer, the total of these two blocks being 32.22 weight %. The terminal oxypropylene blocks were each 17.36% by weight of the polymer for total of 34.72% by weight of the complete five-block polymer. Thus, the overall EO/PO ratio for this diol was very similar to that of the class of diols described in the aforementioned U.S. Pat. No. 3,048,548 patent. The molecular weight of the diol of this Example was closer to the lower end of the 3,000–5,000 molecular weight range than the preferred glycol described in column 3, line 73 et seq. of the patent (in this case, about 3,400); however, as pointed out previously, this entire 3,000–5,000 MW range is within the scope of this invention.

One mole of the liquid poly(oxyethylene/oxypropylene) diol described previously was blended at room temperature with 2.0 moles of phenyl isocyanate (NCO:OH ratio 1:1) by adding the liquid isocyanate at a constant rate, with stirring. To this reaction mixture, 0.003 mole of tri-n-butylamine was added, also at room temperature, and the resulting reaction between the isocyanate and the diol was exothermic. After 2 hours in the reaction vessel, the resulting diaryl urethane was found to have a hydroxyl number below 10, indicating substantial completion of the NCO/OH reaction. The cloud point of the diaryl urethane product was found to be less than 37°F.

Part B: Standards for Comparison of De-foaming Properties

The following compounds are known to be effective de-foaming agents:
1. the benzyl ether-terminated type of compound described in U.S. Pat. No. 3,334,147 (Brunelle et al.),
2. the benzyl ether-terminated ethoxylated alkanol compound described in Example V of U.S. Pat. No. 3,444,242.

Further comparison can be made with the following compounds:
3. the uncapped diol described in Part A of this Example,
4. the phenyl urethane-terminated analog of the compound of Example V of U.S. Pat. No. 3,444,242, i.e. the monoaryl urethane wherein phenyl-NH-CO- is the capping group used in place of benzyl.

Part C: Standardized Detergent Formulation and Foam Test

This Part of this Example makes use of a standardized test developed and used internally by Economics Laboratory, Inc. The test is known as Q.C.T.P. 75 and is dated Apr. 8, 1971. The test involves adding 3 liters of water of the required hardness to a foam machine plastic cylinder-stainless steel beaker assembly (Glewwe Foam Machine). A pump is operated to provide a given water pressure, typically 6 psi, but for this Example, 10 psi was the pressure used. The materials to be tested are added to the water, and the temperature of the water is set at the desired level and carefully controlled. The foam height at the completion of the test provides an index of de-foaming performance. The foam height values obtained are significant in a relative sense, and correlate with results obtained in end-uses.

Each of the above-described standards and the diaryl urethane de-foamer of Part A of this Example were tested in the presence of foam-producing soil (2 grams egg soil) and typical detergent components, all blended with the three liters of water in the foam test machine. The amount of de-foamer in each case (standards and Example 1[A] ) was 0.10 gram. The typical detergent components were as follows:
- 5.35 grams sodium metasilicate
- 3.96 grams sodium tripolyphosphate
- 0.19 grams sodium dichloroisocyanurate The foam height test data are reported in Table I below.

TABLE I

FOAM HEIGHT TEST
Foam Height in Inches at Given Water Temperature

| De-foamer | 75°F. | 100°F. | 140°F. |
|---|---|---|---|
| Example 1[A] (diaryl urethane) | 4.5 | 3.0 | 3.5 |
| Standard (1) (U.S. Pat. 3,334,147) | 6.0 | 3.0 | 5.5 |
| Standard (2) (Ex. V, U.S. Pat. 3,444,242) | 11.00* | 7.50 | 5.50 |
| Standard (3) (uncapped diol of Ex. 1[A]) | 9* | 6.25 | 5.25 |
| Standard (4) (monoaryl urethane) | 7–9.5 | 6.5–6.75 | 3.75–4.50 |

*Unable to maintain 10 psi because of excessive foam.

As will be apparent from the above Table, none of the Standards consistently equals the Example 1[A] diaryl urethane throughout the 75°–140°F. range.

EXAMPLE 2

Re-Wet Compositions and Tests

Re-wet compositions were prepared from the diaryl urethane of Example 1[A], Standard (1) of Example 1[B], and Standard (4) of Example 1[B]. Each of these compositions consisted of 55 weight % of the compound to be tested diluted with 45 weight % of tall oil fatty acid ethoxylate (Emery Industry), hereinafter referred to as "FAE".

Paper samples were made with 28–30 g. of crude wood pulp taken from a master batch of wood pulp so that the comparisons would be meaningful. A standard amount of the re-wet composition to be tested was added before the papermaking slurry was laid down on the screen of the mold. A control sample of paper was made with no re-wet treatment. A drop of water was added to each sample and time to absorb the drop was noted (i.e. the "re-wet time").

Observed re-wet times are set forth in Table II.

TABLE II

RE-WET TIMES

| Sample | Time (in Seconds) |
|---|---|
| Control (no re-wet treatment) | 542. |
| Example 1[A]/FAE | 3.59 |
| Standard(1)/FAE | 6.63 |
| Standard(4)/FAE | 3.9 |

Thus, Standard (1), though better in de-foaming than Standard (4), is less effective in re-wet properties. Neither Standard consistently equals the Example 1[A] diurethane in overall de-foaming/re-wet performance. The cloud point of Standard (4) (alone, without FAE, in 1% aqueous solution) is 68°–72°F.

EXAMPLE 3

In this Example, the procedures of Example 1, Parts A and C and Example 2 were substantially duplicated except that a different diol was used in the preparation of the diaryl urethane (see Part A of Example 1).

The diol was prepared as follows: a homopolymeric center block was prepared from propylene glycol and 40 moles of propylene oxide; 22 moles of ethylene oxide were used to make the two intermediate poly(oxyethylene) blocks on either side of the center block, each intermediate block being obtained from 11 moles of ethylene oxide. The two terminal hydroxyl-terminated blocks were obtained from 3 moles propylene oxide, resulting in an average of 1.5 moles in each terminal block. After capping with phenyl isocyanate in the manner specified in Part A of Example 1, the cloud point of the resulting diurethane (1 weight % aqueous solution) was found to be less than 37°F. The Example 3 diurethane was combined with the standardized detergent formulation as in Example 1, Part C, and foam test Q.C.T.P. 75 was carried out as described previously. The resulting foam height data is set forth in the following Table.

Table III

| Temperature | Foam Height In Inches For De-Foamer of Example 3 |
|---|---|
| 70°F. | 6.5 |
| 100°F. | 4.5 |
| 140°F. | 4.5 |

Thus, the de-foamer of this Example had de-foaming properties at least about equal to Standard (1) (U.S. Pat. No. 3,334,147) and generally comparable to the diurethane of Example 1[A]).

The re-wet test of Example 2 was substantially duplicated. The control for the Example 3 re-wet test (i.e. the paper sample not given a re-wet treatment) had a somewhat shorter re-wet time: 510.9 seconds. The re-wet time for the Standard (1)/FAE (55/45 by weight) combination (see Example 2) was slightly shorter: 6.3 seconds.

For a 55/45 (by weight) combination of Example 3 diurethane/FAE, the re-wet time was 4.6 seconds.

What is claimed is:

1. A rinse additive composition comprising a diaryl urethane blended with a solid wax or a poly(oxyalkylene)-containing wetting agent, said diaryl urethane having the following structural formula:

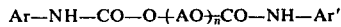

Ar—NH—CO—O-(AO)ₙ-CO—NH—Ar' wherein
Ar and Ar' are monovalent aryl groups free of —NCO radicals,
A is an alkylene group containing 2–4 carbon atoms, at least some of said alkylene groups containing 2 carbon atoms, and $n$ is a number greater than 3 selected such that the divalent radical $-(AO)_n$ has a molecular weight less than 12,000.

2. A rinse additive composition according to claim 1 wherein the divalent radical $-(AO)_n$ is a block copolymer containing at least one block of oxyethylene units and at least one block of oxypropylene units, and wherein said Ar and Ar' are monocyclic aromatic radicals.

3. A rinse additive composition according to claim 1 wherein said diaryl urethane has the following structural formula:

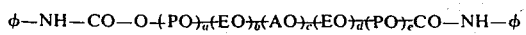

wherein
- φ represents a phenyl group,
- PO represents a propyleneoxy group,
- EO represents an ethyleneoxy group,
- AO represents an alkyleneoxy group of 2–3 carbon atoms, at least some of the AO units being propyleneoxy, and
- $a$, $b$, $c$, $d$, and $e$ are the same or different and are numbers selected such that the ratio of $a+e$ or $b+d$ or $c$ to the sum of $a$, $b$, $c$, $d$, and $e$ is in the range of 0.3–0.4.

4. A rinse additive composition according to claim 1, said composition being solid and comprising a minor amount of the said diaryl urethane blended with a solid wax.

5. A solid rinse additive composition according to claim 4 wherein said solid wax is an alkanolamide wax.

6. A rinse additive composition according to claim 1, said composition being liquid and comprising a poly-(oxyalkylene)-containing wetting agent blended with said diaryl urethane.

7. In a dishwashing formulation containing components comprising 2–70 weight percent of a water conditioning agent and 1–70 weight percent of a pH adjusting agent or buffering agent or builder salt, the improvement which comprises blending 0.1–5 weight percent of a de-foaming agent with the said components of the dishwashing formulation, said de-foaming agent consisting essentially of a diaryl urethane having the following structural formula:

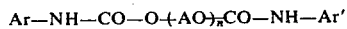

wherein
- Ar and Ar′ are monovalent aryl groups free of —NCO radicals,
- A is an alkylene group containing 2–4 carbon atoms, at least some of said alkylene groups containing 2 carbon atoms, and $n$ is a number greater than 3 selected such that the divalent radical —AO)$_n$ has a molecular weight less than 12,000.

* * * * *